US008745054B1

(12) United States Patent
Hsu et al.

(10) Patent No.: US 8,745,054 B1
(45) Date of Patent: Jun. 3, 2014

(54) METHOD AND APPARATUS FOR LARGE VOLUME TEXT SUMMARY AND VISUALIZATION

(75) Inventors: Wen-Ling Hsu, Bridgewater, NJ (US); Guy J. Jacobson, Bridgewater, NJ (US); Ann Eileen Skudlark, Westfield, NJ (US); Thomas Paul Ventimiglia, North Plainfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 136 days.

(21) Appl. No.: 11/290,864

(22) Filed: Nov. 30, 2005

(51) Int. Cl.
*G06F 7/00* (2006.01)
*G06F 17/30* (2006.01)
*G06F 3/048* (2013.01)

(52) U.S. Cl.
USPC ............ 707/737; 715/853; 707/750; 707/798

(58) Field of Classification Search
USPC .................. 707/3, 6, E17.058, 737, 750, 798; 706/20; 715/853
See application file for complete search history.

(56) References Cited

U.S. PATENT DOCUMENTS

| 6,738,786 B2 | 5/2004 | Sugaya et al. |
| 6,757,676 B1 | 6/2004 | Sugaya et al. |
| 2005/0149494 A1* | 7/2005 | Lindh et al. ....................... 707/3 |

OTHER PUBLICATIONS

Ketan K. Mane and Katy Börner Mapping topics and topic bursts in PNAS PNAS 2004 101 (Suppl 1) 5287-5290; published ahead of print Feb. 20, 2004, doi:10.1073/pnas.0307626100. Retrieved Mar. 31, 2014.*
Book Title—Computational Linguistics and Intelligent Text Processing Chapter Title—Disentangling from Babylonian Confusion—Unsupervised Language Identification pp. 773-784 vol. 3406/2005 Copyright—2005, Jan. 27, 2005 Authors—Chris Biemann, Sven Teresniak Link—http://www.springerlink.com/cont.*
Chris Biemann and Sven Teresniak. 2005. Disentangling from babylonian confusion—unsupervised language identification. In Proceedings of the 6th international conference on Computational Linguistics and Intelligent Text Processing (CICLing'05), Alexander Gelbukh (Ed.). Springer-Verlag, Berlin, Heidelberg, 773-784. DOI=10.1007/978-3-540-30586-6_87.*
Fact Sheet "SAS Text Miner—Capitalize on the value hidden in textual information", SAS the Power to Know; four pages; Copyright 2005.

* cited by examiner

*Primary Examiner* — Ann Chempakaseril

(57) ABSTRACT

A system, a method, an apparatus, and a computer-readable medium are provided. Co-occurrences of words or terms in a group of text documents are determined. A score for each of the co-occurrences of words or terms is calculated. A graphic view is presented. The graphic view has nodes that include at least one word or term and edges that join at least two nodes and depict a relationship among the at least two nodes. A layout of the graphic view includes a minimum number of crossings of the edges.

18 Claims, 4 Drawing Sheets

| WORD | % OF EMAILS WITH WORD |
|---|---|
| CERTIFICATE | 77.94% |
| amazon.com | 58.33% |
| 20 | 55.39% |
| GIFT | 53.92% |
| RECEIVE | 50% |
| THANKS | 46.08% |
| UP | 40.20% |
| SIGN | 37.75% |
| WHEN | 36.76% |
| HOW | 35.78% |

| PHRASE | % OF EMAILS WITH PHRASE |
|---|---|
| gift certificate | 47.55% |
| sign up | 37.25% |
| online billing | 25.98% |
| 20 amazon.com | 23.53% |
| receive 20 | 20.10% |
| up online | 20.10% |
| amazon.com certificate | 17.65% |
| amazon.com | 14.71% |
| when receive | 13.73% |
| 20 gift | 13.24% |

FIG. 5

| | Exceed | | | | | | | | |
|---|---|---|---|---|---|---|---|---|---|
| | No Name | | | | | | | | |
| Select a File: | | | | | | | | | |
| /hera/NBD3/adjust/COMMENTS/data/result... | | | | | | | | | |
| /hera/NBD3/adjust/COMMENTS/data/result... | | | | | | | | | |
| /hera/NBD3/adjust/COMMENTS/data/result... | | | | | | | | | |
| | | Graph | Pair List | Word List | | | | | |
| Docs in file: 2169 | | Name | Score | Docs in... | Freq in... | Tfidf in... | Expected... | Freq in... | Tfidf in... |
| Docs in Corpus: 6843 | | called customer | 0.0030 | 300 | 0.1701 | 0.3030 | 0.1101 | 1014 | 0.1402 |
| | | called in | 0.0707 | 347 | 0.1000 | 0.2057 | 0.0032 | 953 | 0.1303 |
| Edges: 20 | | date due | 0.0011 | 170 | 0.0704 | 0.2330 | 0.0133 | 330 | 0.0491 |
| Name: Debit | | inside wire | 0.0507 | 234 | 0.1070 | 0.3024 | 0.0120 | 615 | 0.0000 |
| Occs in file: 108 (out of 2169) | | customer if | 0.0540 | 154 | 0.0710 | 0.1930 | 0.0520 | 300 | 0.0452 |
| Feq in file: 0.0498 | | order status | 0.0300 | 121 | 0.0550 | 0.1023 | 0.0172 | 207 | 0.0410 |
| Tfidf in file: 0.1604 | | gul under | 0.0350 | 113 | 0.0521 | 0.1539 | 0.0107 | 264 | 0.0386 |
| Occs in corpus: 459 (out of 6843) | | call reached | 0.0343 | 105 | 0.0484 | 0.1508 | 0.0035 | 234 | 0.0342 |
| Feq in corpus: 0.0671 | | address verification | 0.0332 | 108 | 0.0498 | 0.1494 | 0.0033 | 254 | 0.0371 |
| Tfidf in corpus: 0.1923 | | cmc refer | 0.0315 | 91 | 0.0420 | 0.1330 | 0.0037 | 190 | 0.0278 |
| | | follow up | 0.0279 | 95 | 0.0438 | 0.1385 | 0.0034 | 231 | 0.0338 |
| | | please refer | 0.0272 | 83 | 0.0383 | 0.1249 | 0.0029 | 184 | 0.0269 |
| | | visit wire | 0.0260 | 86 | 0.0396 | 0.1488 | 0.0051 | 205 | 0.0300 |
| | | cmc handling | 0.0258 | 71 | 0.0327 | 0.1119 | 0.0025 | 138 | 0.0202 |
| | | complete status | 0.0246 | 87 | 0.0401 | 0.1305 | 0.0053 | 217 | 0.0317 |
| | | details please | 0.0241 | 62 | 0.0286 | 0.1016 | 0.0018 | 105 | 0.0153 |
| | | customer requires | 0.0240 | 64 | 0.0295 | 0.1040 | 0.0170 | 117 | 0.0171 |
| | | lsog verification | 0.0238 | 76 | 0.0350 | 0.1174 | 0.0021 | 176 | 0.0257 |
| | | account post | 0.0221 | 58 | 0.0262 | 0.1185 | 0.0067 | 103 | 0.0151 |
| | | debit post | 0.0217 | 58 | 0.0262 | 0.0985 | 0.0030 | 107 | 0.0156 |

502

METHOD AND APPARATUS FOR LARGE VOLUME TEXT SUMMARY AND VISUALIZATION

BACKGROUND OF THE INVENTION

1. Field of the Invention

The present invention relates to summarizing large volume text documents and more specifically to a system and method for visually summarizing large volume text documents.

2. Introduction

Companies often collect a large corpus of unstructured text data such as, for example, e-mail messages, transcriptions of customer comments, phone conversations, or physical mail. Managers may wish to learn about the contents of the data such that they may understand or act upon the information contained within the data. Because of the large volume of data, it is too expensive and difficult to individually read each document in the corpus. Further, the data's lack of structure makes conventional tools insufficient to facilitate the understanding of the contents of the data.

Existing tools that perform automatic summarization of textual data are typically textual in nature. Some tools provide visual graphics with respect to word frequencies, but do not provide any other visually graphic information.

Thus, there is a need for a tool that facilitates the understanding of large volume unstructured text corpora that takes advantage of human cognitive visualization capability.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for graphically summarizing a group of text documents is provided. Co-occurrences of words or terms in the group of text documents are determined. A score for each of the co-occurrences of words or terms is calculated. A graphic view is presented. The graphic view has nodes that include at least one word or term and edges that join at least two nodes and depict a relationship among the at least two nodes. A layout of the graphic view includes a minimum number of crossings of the edges.

In a second aspect of the invention, an apparatus is provided. The apparatus includes a processor, a memory and an output device. The processor is configured to determine co-occurrences of words or terms in a group of text documents, calculate a score for each of the co-occurrences of words or terms, and present a graphic view having nodes including at least one word or term and edges that join at least two nodes and depict a relationship among the at least two nodes.

In a third aspect of the invention, a machine-readable medium is provided that has instructions for a processor recorded thereon. The machine-readable medium includes instructions for determining co-occurrences of words or terms in a group of text documents, instructions for calculating a score for each of the co-occurrences of words or terms, and instructions for presenting a graphic view having nodes including at least one word or term and edges joining at least two nodes and depicting a relationship among the at least two nodes. A layout of the graphic view includes a minimum number of crossings of the edges.

In a fourth aspect of the invention, an apparatus is provided. The apparatus includes means for determining co-occurrences of words or terms in a group of text documents, means for calculating a score for each of the co-occurrences of words or terms, and means for presenting a graphic view having nodes including at least one word or term and edges joining at least two nodes and depicting a relationship among the at least two nodes. A layout of the graphic view includes a minimum number of crossings of the edges.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates an exemplary statistical view of data that may be used to produce the graphical view.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Introduction

Figures 1, 2:
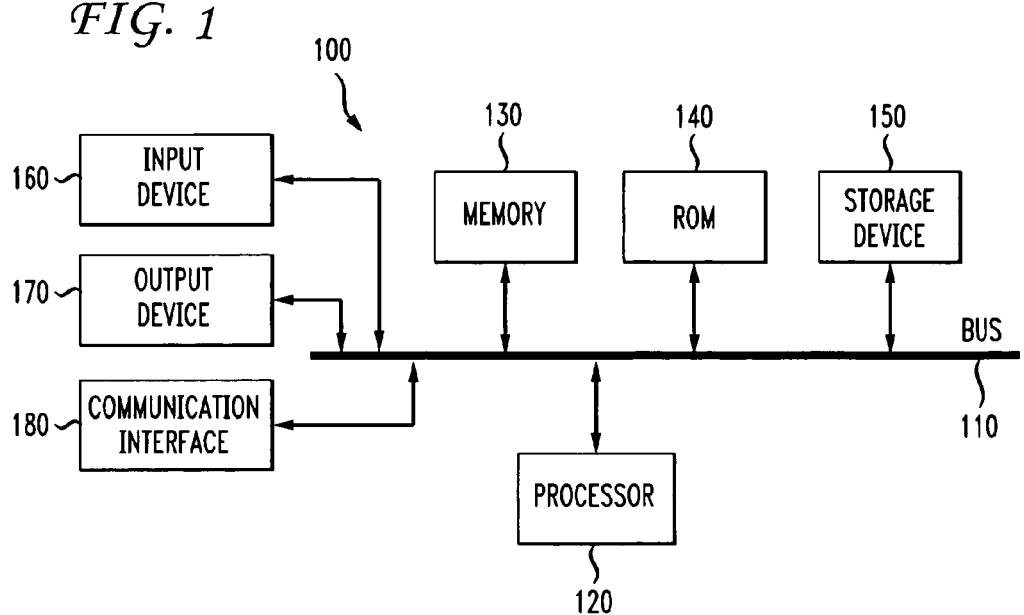
FIG. 1 illustrates an exemplary system in which implementations consistent with the principles of the invention may operate.
FIG. 2 is an exemplary table that illustrates words or terms and their corresponding frequencies of occurrence in documents expressed as percentages of documents that include a corresponding word or term.
Figures 3, 4:
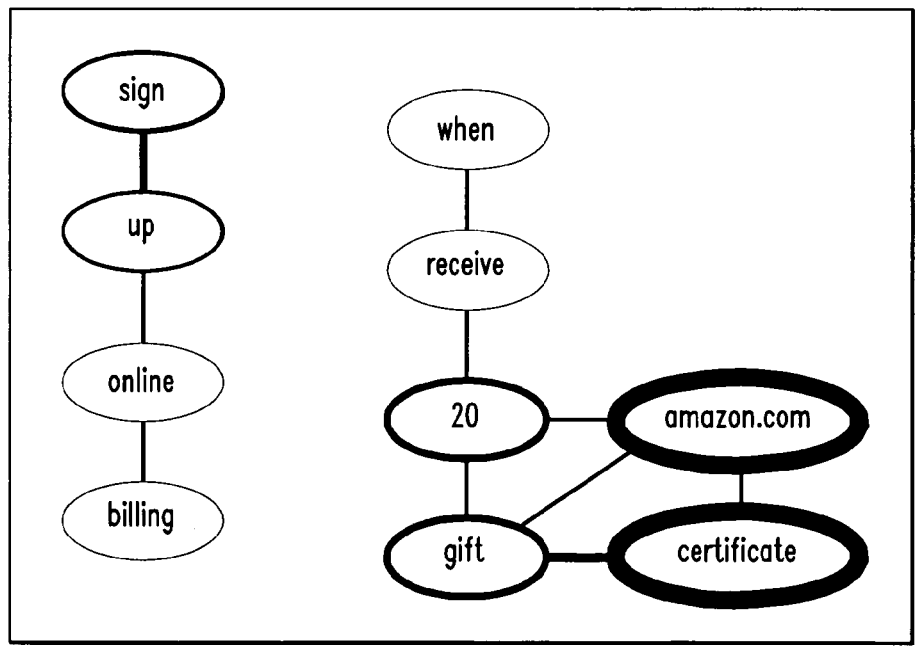
FIG. 3 is an exemplary table that illustrates occurrences of pairs of words or terms and their corresponding frequencies of occurrence in a group of documents.
FIG. 4 illustrates an exemplary graphical view including nodes and edges.

Many companies maintain a massive database of large numbers of text files such as customer feedback information. Managers may wish to review the data for a variety of reasons such as, for example, to identify the causes of problems, to identify opportunities for improvement, or to obtain ideas for new products. Implementations consistent with the principles of the invention may create a summary of the database of text files in an intuitive, easy-to-read graphical form. Various implementations may present a graphical representation of words appearing in the large number of text files and relationships among the words. In some implementations consistent with the principles of the invention, a rank order of the salient relationships among words or among groupings of words may be determined based on a computed score value. The rank order may be used to determine which of the relationships to display. Once the words or groupings of words and relationships among the words are determined, an undirected graph may be presented, as shown in FIG. 4, using a graphical device, such as, for example, a computer display device. The score may be based, at least in part, on a frequency of occurrence of a word or groups of words and may be indicated by using various visual techniques, such as, for example, particular colors, thickness of lines, size of displayed objects, or typography (font, boldness, slant) of displayed text in portions of the presented graphical representation Exemplary Processing Device FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive. In some implementations consistent with the principles of the invention, storage device 150 may store and retrieve data according to a database management system.

Input device 160 may include one or more conventional mechanisms that permit a user to input information to processing device 100, such as a keyboard, a mouse, a pen, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Processing device 100 may be, for example, a personal computer (PC), or any other type of processing device. In alternative implementations, such as, for example, a distributed processing implementation, a group of processing devices 100 may communicate with one another via a network such that various processors may perform operations pertaining to different aspects of the particular implementation.

Word Analysis Example

Typically, company managers may not know why customers send e-mail or other messages to the company during any given time period. In this example, a company offers a $20.00 Amazon.com gift certificate to those customers who sign up for online billing. As a result of the company's offer, many customers may send e-mails to the company asking when and how they would receive the gift certificate. FIG. 2 shows exemplary word analysis of some of the more frequently used words or terms and a percentage of customer e-mails that include the words or terms used during a given time period after the company's offer. As shown in FIG. 2, the word "certificate" may appear in 77.94% of the e-mails, the term "Amazon.com" may appear in 58.33% of the e-mails, "20" in 55.39% of the e-mails, and so on.

Instead of only analyzing the frequency of single words or terms, implementations consistent with the principles of the invention may analyze groups or co-occurrences of words or terms. For example, FIG. 3 shows exemplary results of analyzing pairs of words or terms appearing in e-mails with respect to the above-mentioned gift certificate example. As shown in FIG. 3, the phrase "gift certificate" may appear in 47.55% of the e-mails, "sign up" may appear in 37.25% of the e-mails, "online billing" may appear in 25.98% of the e-mails, etc. Thus, the higher the percentage of e-mails or documents that include a co-occurrence of words or terms, the stronger the relationship among the words or terms.

Exemplary Graphical Presentation

FIG. 4 illustrates an exemplary graphic presentation that may be presented by implementations consistent with the principals of the invention. In FIG. 4, words or terms are shown as being included in nodes and relationships, such as co-occurrences among words or terms, are shown by an edge or line connecting nodes including the words or terms. In FIG. 4, the co-occurrences of words are word pairs. A thickness of a line of a node may indicate a range of a value of a score based, at least in part, on a function of a frequency of occurrence in a group of documents or a corpus of at least one word or term included in the node. In a simple implementation, a score of a node may be the frequency of occurrence within the corpus of the at least one word or term included in the node. For example, a thicker line may indicate a higher score. Thus, according to FIG. 4, the words "certificate" and "Amazon.com" have higher scores than the word "gift" and the term "20", which have higher scores than the words "up" and "sign", which have higher scores than the words "online", "billing", "when" and "receive". Similarly, a thickness of an edge between nodes may indicate a strength of a relationship between the words or terms of the nodes connected by the edge. For example, a thicker line may indicate a stronger relationship. In some implementations, the strength of the relationship between words or terms of nodes connected by an edge may be a score value computed as a function of a frequency of co-occurrence of the words or terms of the connected nodes. Thus, according to FIG. 4, a very strong relationship exists between the words "certificate" and "gift", while a weaker relationship exists between the terms "20" and "Amazon.com" and an even weaker relationship is shown between the term "20" and the word "gift. In other implementations consistent with the principles of the invention, thicker lines for nodes may indicate a lower score range for the words or terms of the nodes and a thicker edge may indicate a weaker relationship or lower score range with respect to word groupings of words included in connected nodes.

In other implementations consistent with the principles of the invention, the score range of the at least one word or term of a node may be indicated by using a particular color. For example, a very high frequency range of occurrence may be indicated by using a hot color, such as, for example, red, while a very low frequency of occurrence may be indicated by a cool color, such as, for example, blue. Similarly, a color of an edge may be used to indicate a strength of a relationship between words of the nodes connected by the edge. Of course, other choices of colors for lines of nodes may be used to indicate particular score ranges for words or terms of nodes and strengths of relationships of the words or the terms of nodes may be indicated by other choices of colors for edges connecting nodes.

Other implementations may use other visual techniques to indicate score range, such as, for example, size of displayed objects (nodes, edges), or typography (font, boldness, slant) of displayed text in portions of the presented graphical representation.

Although FIG. 4 illustrates one word or term per node, nodes may represent more than one term or word. For example, a preprocessor may parse documents in the corpus for meaningful lexical units, such as, for example, "United States", which may be included in a single node. Such meaningful lexical units may be treated as a single word or term in implementations.

Further, in some implementations consistent with the principles of the invention, a synonym processor may be used to group synonyms together. For example, the words "ads", "advertisements", and "commercials" may be grouped together by the synonym processor, such that an occurrence of any of the words, "ads", "advertisements", or "commercials", may be treated as a single word, for example, "commercials", which may be a word appearing in a node of the graphical view. The synonym processor may also perform stemming or extraction of a root word. For example, words such as, "billed", "bill", and "billing", may be grouped together such that occurrences of these words may be treated as single word, for example, "bill", which may appear within a node of the graphical view. WordNet®, which is available from the Princeton University Cognitive Science Lab, is a software tool that may be used in implementations consistent with the principles of the invention to perform stemming and grouping of synonyms.

In implementations consistent with the principles of the invention, edges may indicate a co-occurrence of words or terms and a visual indication, such as color or line thickness may indicate a strength of the co-occurrence. In various implementations, co-occurrence may have different meanings. For example, in one implementation, co-occurrence may be defined as at least two words or terms occurring in a same document. In other implementations, co-occurrence may be defined as two or more words or terms occurring within a particular number of words or terms, such as, for example, within one hundred words or terms within a document, or contiguous to one another within a document. Yet, in other implementations, co-occurrence may be defined as two or more words or terms occurring within a configurable number of words within a document.

Implementations consistent with the principles of the invention may provide a graphic presentation of nodes and edges in an undirected graph, as illustrated by FIG. 4, with qualities, such as a minimum number of edge crossings, short, straight edges where possible, and closely related nodes placed near one another to enable a human being to easily view and understand relationships among the nodes. The edges are the lines between the nodes. For example, the line between the "gift" node and the "certificate" node is an edge that is thicker to contain or represent a stronger connection between the nodes. In FIG. 4, none of the edges cross but in some cases, there may be crossing edges and the graphical display is designed to minimize such crossings. Any one of a number of well-known graphing techniques may be used to create such an undirected graph. In some implementations consistent with the principles of the invention, graphing software, such as, for example, GraphViz®, which is available from AT&T Inc. of San Antonio, Tex., may be used to generate graphs with the above-mentioned qualities having nodes and edges. A cluttered graphical presentation with numerous edge crossings may tend to make the relationship among nodes harder to view and therefore, more difficult for a human being to easily recognize and understand.

Implementations consistent with the principles of the invention may provide a user with the ability to indicate a maximum number of edges and/or a maximum number of nodes to include in the graphic presentation. For example, the user may indicate a maximum number of edges or nodes by making a selection on a menu or by entering a number via a keyboard, speaking into a microphone and using speech recognition techniques, or via other input means.

Statistical View

FIG. 5 illustrates an exemplary display of a statistical view of data that may be used to produce the graphical view. The statistical view may include tabs 502, which may be selected by a user using a pointing device, such as, for example, a mouse, a stylus, an electronic pen, or other pointing device to select a particular tab. In the exemplary displayed statistical view pf FIG. 5, a "pair list" tab was selected, thereby causing a display of word pairs, or co-occurrences of two words, followed by several columns of statistics, which may include a co-occurrence score, a number of occurrences of the co-occurrence of two words in a corpus, a frequency of occurrence of the co-occurrence of the two words in the corpus, etc. A number of various statistics concerning the co-occurrence of the two words may be included in the display.

Similarly, if the user selects another tab using the pointing device, such as, for example, a "word list" tab, a list of words may be displayed, along with various statistics with respect to each of the words listed. The displayed statistics may include statistics used to produce the graphic view.

If the user selects another tab using the pointing device, such as, for example, a "graph" tab", a graphical view, such as, for example, the graphical view shown in FIG. 4, may be displayed.

The data and tabs shown in FIG. 5 are exemplary and are not intended to limit implementations of the invention. Other tabs and statistical data may also be displayed or may be displayed instead of the exemplary data and tabs. Further, in some implementations, a user may cause an order of data to be rearranged in a statistical view by, for example, selecting a particular column. For example, if a score column is selected, data may be arranged according to a descending score value. If the user again selects the score column, the data may be rearranged according to an ascending score value.

Interactive Graphical View

Implementations consistent with the principles of the invention may include an interactive graphical view. In such an implementation, a graph similar to the graph of FIG. 4 may be displayed. When a user places the pointing device over a node or an edge, statistics concerning the particular node or the particular edge may appear superimposed over a portion of the graphical view. For example, when the user places the pointing device over a node, various statistics concerning the node may be displayed, such as a word or words of the node, frequency of occurrence in the corpus, a score value for the node, etc. When the user places the pointing device over the particular edge, various statistics concerning the edge may be displayed, such as words of nodes connected by the edge, frequency of occurrence within a corpus of the co-occurrence of words from the connected nodes, a number of occurrences of the co-occurrence within the corpus of the words from the connected nodes, etc. The above description of the type of data and statistics displayed when the pointing device is placed over a node or edge are exemplary. In other implementations, other types of data or statistics may be displayed in addition to or instead of the exemplary types of data and statistics mentioned.

In some implementations, a user may select, using the pointing device, a node or edge displayed in the graphic view by for example, clicking on the node or edge with a computer mouse, touching the node or edge with a stylus or electronic pen, or by other means. When the node or edge is selected, detailed information about the node or edge may be displayed. The detailed information may include, for example, the exemplary data mentioned above and/or other data including information from records containing words or terms included in a selected node or a relationship indicated by a selected edge.

Exemplary Process

Figure 6:
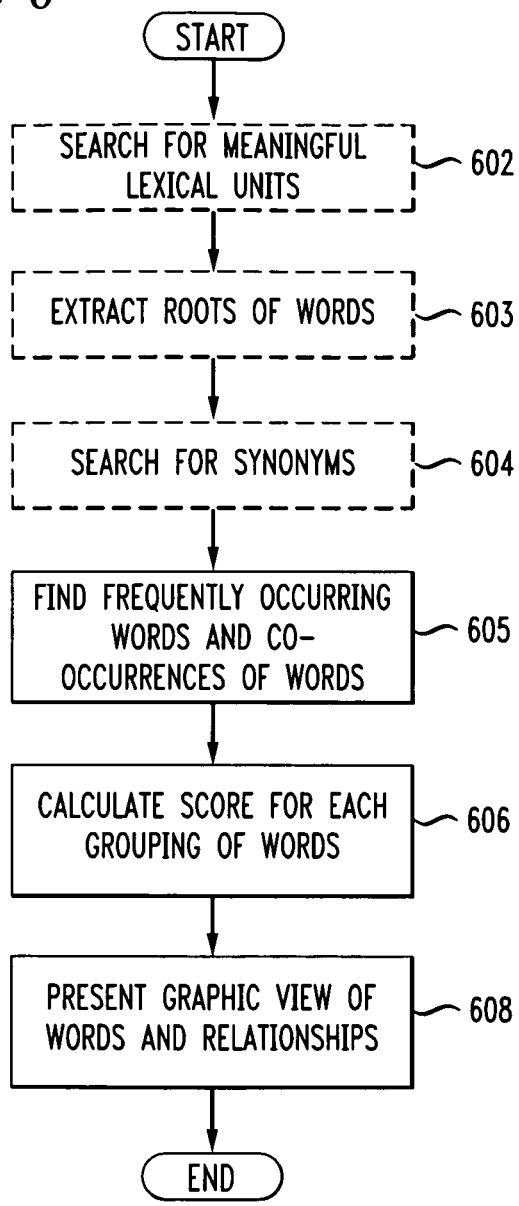
FIG. 6 is a flowchart that illustrates an exemplary process that may be employed in implementations consistent with principles of the invention.

FIG. 6 is a flowchart that illustrates an exemplary process that may be used in implementations consistent with the principles of the invention. The process may optionally begin with preprocessing documents in the corpus or database to search for meaningful lexical units, such as, for example, "United States" (act 602). A found meaningful lexical unit may be treated as single word or a single term. The process may then optionally extract a root word of each word and may map each word to its root word (act 603). Thus, only a root word may be included in graphical and statistical views instead of the word and its variations and statistics pertaining to the root word and its variations may be included with the statistics for the root word. Similarly, the process may optionally determine whether a word has a synonym and may map synonyms of the word to a single word (act 604). Thus, only a representative particular word may be included in graphical and statistical views instead of the word and its various synonyms and statistics pertaining to the word and its synonyms may be included with the statistics for the representative particular word. Implementations that perform optional act 603 and/or act 604 may reduce variations that occur in language. Next, the process may find frequently occurring words or terms and groupings or co-occurrences of words or terms in a text corpus or database (act 605). The process may then calculate a score for each word or term and grouping (co-occurrence) of words or terms (act 606).

In one implementation, the score for a word or term may be a frequency of occurrence of the word or term in a corpus. Various methods may be user to calculate scores as described below. A graphic view showing words or terms and relationships may be presented (act 608). The graphic view may be similar to that shown in FIG. 4 and may visually indicate a range of scores for words or terms and a range of scores for co-occurrences or groupings of words to indicate a strength of a co-occurrence relationship. Implementations consistent with the principles of the invention may indicate the range of frequency of occurrence of word(s) of a node by using particular colors to color a line that is included in a graphic presentation of a node or to fill an area of the node by particular colors. The strength of a relationship between nodes may also be indicated by using particular colors to color lines representing edges. Similarly, line thickness may instead be used to indicate a range of frequency of occurrence of word(s) of a node or a strength of a relationship between words of two nodes. Other implementations may use other visual techniques to indicate score range, such as, for example, size of displayed objects (nodes, edges), or typography (font, boldness, slant) of displayed text in portions of the presented graphical representation.

Scoring Techniques

A number of different scoring methods may be used to calculate a score of an edge in implementations consistent with the principles of the invention. For example, assuming that the frequency of a pair (or co-occurrence) of words is independent with respect to the frequency of occurrence of each of the individual words, then, if word A and word B are randomly distributed among text documents with frequencies of occurrence freq(A) and freq(B), the expected frequency of co-occurrence of the words A and B in documents, E(freq(A, B)), is equal to freq(A) multiplied by freq(B). For example, if freq(A) is 10% (that is, 10% of the documents have an occurrence of word A) and freq(B) is 30%, and word A and word B are independent and randomly distributed among the text documents, then E(freq(A, B)) is 10% multiplied by 30%, which is equal to 3%. A "difference" score for a co-occurrence of words A and B may be calculated according to:

$$\text{score}(A,B) = \text{freq}(A,B) - E(\text{freq}(A,B)) \tag{Eq. 1}$$

Another method for calculating a score that may be used in implementations consistent with the principles of the invention calculates a "Euclidean" score. A "Euclidean" score may be calculated according to the following formula:

$$\text{score}(A, B) = \sqrt{\text{freq}(A, B)^2 - E(\text{freq}(A, B))^2} \tag{Eq. 2}$$

The "Euclidean" score is similar to the "difference" score, but instead, favors higher-frequency co-occurrences of words.

Another method for calculating a score that may be used in implementations consistent with the principles of the invention calculates a "ratio" score. The "ratio score may be calculated according to the following formula:

$$\text{score}(A, B) = \frac{\text{freq}(A, B)}{E(\text{freq}(A, B))} \tag{Eq. 3.}$$

"Ratio" scores favor low-frequency, high co-occurrence groups such as, for example, (Boise, Id.").

"Cubic ratio" scoring is another method that may be used in implementations consistent with the principles of the invention. "Cubic ratio" scores may be calculated according to the following formula:

$$\text{score}(A, B) = \frac{\text{freq}(A, B)^3}{E(\text{freq}(A, B))} \quad \text{(Eq. 4)}$$

"Cubic ratio" scores increase the influence of raw frequency over a final score.

When a corpus contains highly-correlated grouping or co-occurrences of words such as, for example, word pairs, that are not useful in analyzing contents of the corpus, probability-based scoring isn't very useful. Instead, corpus-based edge scoring may be employed in implementations consistent with the principles of the invention. Using corpus-based edge scoring, the frequency of a co-occurrence of words such as, for example, a pair of words may be compared with the frequency of the pair of words in a large heterogeneous corpus or database.

In one implementation consistent with the principles of the invention, methods similar to the "difference", "Euclidean", "ratio" and "cubic ratio" methods may be used. These methods differ from the above-mentioned methods in that the expected frequency of the grouping or co-occurrence of words A and B, E(freq (A, B)) is replaced with the expected frequency of the grouping or co-occurrence of words A and B in the corpus or database.

Other scoring methods that may be employed in implementations consistent with the principles of the invention may include term frequency-inverse document frequency (TFIDF) scoring. In one TFIDF method, scoring may be performed according to the formula:

$$\text{TFIDF}(\text{word grouping,category}) = TF * \log(IDF) \quad \text{(Eq. 5)}$$

where TF is the average number of occurrences of a co-occurrence, such as, for example, a word pair, per document in a particular category. IDF is equal to 1/(% of documents in category having the co-occurrence).

In implementations consistent with the principles of the invention, the "difference", "Euclidean, "ratio", or "cubic ratio" methods may be used, such that the TFIDF is substituted for freq(A, B) and E(TFDIF(A, B)) is substituted for E(freq(A, B)). Thus, the "difference", "Euclidean", "ratio", and "cubic ratio" formulas for TFDIF may become, respectively:

$$\text{score}(A,B) = \text{TFIDF}(A,B) - E(\text{TFDIF}(A,B)) \quad \text{(Eq. 6)}$$

$$\text{score}(A, B) = \sqrt{\text{TFIDF}(A, B)^2 - E(\text{TFIDF}(A, B))^2} \quad \text{(Eq. 7)}$$

$$\text{score}(A, B) = \frac{\text{TFIDF}(A, B)}{E(\text{TFIDF}(A, B))} \quad \text{(Eq. 8)}$$

$$\text{score}(A, B) = \frac{\text{TFIDF}(A, B)^3}{E(\text{TFIDF}(A, B))} \quad \text{(Eq. 9)}$$

where A, B is a co-occurrence of words A and B.

In other implementations consistent with the principles of the invention, TFIDF(word grouping, category) may be employed such that the "difference", "Euclidean", "ratio", and "cubic ratio" formulas may become, respectively:

$$\text{score}(A,B) = \text{TFIDF}(A,B,\text{category}) - E(\text{TFDIF}(A,B,\text{category})) \quad \text{(Eq. 10)}$$

$$\text{score}(A, B) = \sqrt{\text{TFIDF}(A, B, \text{category})^2 - E(\text{TFIDF}(A, B, \text{category}))^2} \quad \text{(Eq. 11)}$$

$$\text{score}(A, B) = \frac{\text{TFIDF}(A, B, \text{category})}{E(\text{TFIDF}(A, B, \text{category}))} \quad \text{(Eq. 12.)}$$

$$\text{score}(A, B) = \frac{\text{TFIDF}(A, B, \text{category})^3}{E(\text{TFIDF}(A, B, \text{category}))} \quad \text{(Eq. 13)}$$

Although specific scoring methods were discussed above, numerous other scoring methods may be employed in various implementations consistent with the principles of the invention.

CONCLUSION

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. In addition, other types of information may also be displayed. For example, implementations consistent with the principles of the invention may display a corpus size (in number of documents) and a number of documents in a particular file being shown in the graphical view. Similarly, information such as corpus size and a number of documents in a particular file may be displayed in a statistical view, as can be seen in FIG. 5. Accordingly, the appended claims and their legal equivalents should only define the invention, rather than any specific examples given.

We claim as our invention:

1. A method comprising:
   determining, via a processor, pairs of words, where each pair of words in the pairs of words comprises a first word and a second word, with both the first word and the second word occurring together in more than one text document of a plurality of text documents;
   determining, for the each pair of words in the pairs of words:
      a first word frequency based on appearances of the first word in the plurality of text-documents;
      a second word frequency based on appearances of the second word in the plurality of text-documents; and
      a co-occurrence frequency based on appearances of both the first word and the second word together in the plurality of documents;
   receiving, from a user, an input indicating a maximum number of edges and a maximum number of nodes to include in a graphic presentation;
   displaying, on a first tab, a statistical view portion of the graphical presentation, the statistical view comprising the first word frequency, the second word frequency, and the co-occurrence frequency; and
   displaying, on a second tab, an interactive view portion of the graphical presentation, the interactive view portion comprising the first word and the second word each having a color, a size, font, boldness, slant, and a thickness determined based on the first word frequency and the second word frequency, respectively, while edges connect the first word and the second word, the edges having the associated color and the thickness determined based on the co-occurrence frequency of the each pair of words.

2. The method of claim 1, wherein the first word and the second word frequency further comprises a frequency of synonyms of the first word and the second word, respectively.

3. The method of claim 1, wherein determining the co-occurrence frequency further comprises:
   determining a measured frequency of the co-occurrence frequency and an expected frequency of the co-occurrence frequency, based on the first word frequency and the second word frequency.

4. The method of claim 1, wherein
   the first word frequency, the second word frequency, and the co-occurrence frequency are determined using inverse document frequency scoring.

5. The method of claim 1, wherein a key is displayed explaining the color, the size, and the thickness.

6. The method of claim 5, wherein an area exists encompassed by lines of a particular color.

7. A system comprising: a processor; and a memory having instructions stored which, when executed on the processor, cause the processor to perform a method operations comprising:
   determining pairs of words, where each pair of words in the pairs of words comprises a first word and a second word, with both the first word and the second word occurring together in more than one text document of a plurality of text documents;
   determining, for the each pair of words in the pairs of words: a first word frequency based on appearances of the first word in the plurality of text-documents;
   a second word frequency based on appearances of the second word in the plurality of text-documents; and
   a co-occurrence frequency based on appearances of both the first word and the second word together in the plurality of documents;
   receiving, from a user, an input indicating a maximum number of edges and a maximum number of nodes to include in a graphic presentation;
   displaying, on a first tab, a statistical view portion of the graphical presentation, the statistical view comprising the first word frequency, the second word frequency, and the co-occurrence frequency; and
   displaying, on a second tab, an interactive view portion of the graphical presentation, the interactive view portion comprising the first word and the second word each having a color, a size, font, boldness, slant, and a thickness determined based at least on the first word frequency and the second word frequency, respectively, while edges connect the first word and the second word, the edges having the associated color and the thickness determined based on the co-occurrence frequency of the each pair of words.

8. The system of claim 7, wherein the first word and the second word frequency further comprises a frequency of synonyms of the first word and the second word, respectively.

9. The system of claim 7, wherein determining the co-occurrence frequency further comprises:
   determining a measured frequency of the co-occurrence frequency and an expected frequency of the co-occurrence frequency, based the first word frequency and the second word frequency.

10. The system of claim 7, wherein
    the first word frequency, the second word frequency, and the co-occurrence frequency are determined using inverse document frequency scoring.

11. The system of claim 7, wherein a key is displayed explaining the color, the size, and the thickness.

12. The system of claim 11, wherein an area exists encompassed by lines of a particular color.

13. A memory device having instructions stored which, when executed on a computing device, cause the computing device to perform operations comprising:
- determining pairs of words, where each pair of words in the pairs of words comprises a first word and a second word, with both the first word and the second word occurring together in more than one text document of a plurality of text documents;
- determining, for the each pair of words in the pairs of words:
  - a first word frequency based on appearances of the first word in the plurality of text-documents;
  - a second word frequency based on appearances of the second word in the plurality of text-documents; and
  - a co-occurrence frequency based on appearances of both the first word and the second word together in the plurality of documents;
- receiving, from a user, an input indicating a maximum number of edges and a maximum number of nodes to include in a graphic presentation;
- displaying, on a first tab, a statistical view portion of the graphical presentation, the statistical view comprising the first word frequency, the second word frequency, and the co-occurrence frequency; and
- displaying, on a second tab, an interactive view portion of the graphical presentation, the interactive view portion comprising the first word and the second word each having a color, a size, font, boldness, slant, and a thickness determined based on the first word frequency and the second word frequency, respectively, while edges connect the first word and the second word, the edges having the associated color and the thickness determined based on the co-occurrence frequency of the each pair of words.

14. A memory device of claim 13, the first word and the second word frequency further comprises a frequency of synonyms of the first word and the second word, respectively.

15. A memory device of claim 13, wherein determining the co-occurrence frequency further comprises:
- determining a measured frequency of the co-occurrence frequency and an expected frequency of the co-occurrence frequency, based the first word frequency and the second word frequency.

16. A memory device of claim 13, wherein
- the first word frequency, the second word frequency, and the co-occurrence frequency are determined using inverse document frequency scoring.

17. A memory device of claim 13, wherein a key is displayed explaining the color, the size, and the thickness.

18. A memory device of claim 17, the steps further displaying an area encompassed in a particular color.

* * * * *

UNITED STATES PATENT AND TRADEMARK OFFICE
CERTIFICATE OF CORRECTION

PATENT NO. : 8,745,054 B1  
APPLICATION NO. : 11/290864  
DATED : June 3, 2014  
INVENTOR(S) : Wen-Ling Hsu et al.

Page 1 of 1

It is certified that error appears in the above-identified patent and that said Letters Patent is hereby corrected as shown below:

In the Claims

Col. 12, Claim 7, line 17, change "a method operations" to --operations--

Col. 12, Claim 9, line 58, change "based the first word frequency" to --based on the first word frequency--

Col. 14, Claim 14, line 9, change "claim 13, the first word" to --claim 13, wherein the first word--

Col. 14, Claim 15, line 16, change "based the first word frequency" to --based on the first word frequency--

Col. 14, Claim 18, lines 24-25, change "the steps further displaying an area encompassed" to --wherein an area is encompassed--

Signed and Sealed this  
Twenty-third Day of February, 2016

Michelle K. Lee  
*Director of the United States Patent and Trademark Office*